(12) United States Patent
Ardis

(10) Patent No.: US 10,602,808 B2
(45) Date of Patent: Mar. 31, 2020

(54) BUCKLE ASSEMBLY

(71) Applicant: Patrick M. Ardis, Cordova, TN (US)

(72) Inventor: Patrick M. Ardis, Cordova, TN (US)

(*) Notice: Subject to any disclaimer, the term of this patent is extended or adjusted under 35 U.S.C. 154(b) by 113 days.

(21) Appl. No.: 15/909,480

(22) Filed: Mar. 1, 2018

(65) Prior Publication Data

US 2019/0269205 A1 Sep. 5, 2019

(51) Int. Cl.
*A44B 11/25* (2006.01)
*B60R 22/00* (2006.01)

(52) U.S. Cl.
CPC ...... *A44B 11/2569* (2013.01); *A44B 11/2561* (2013.01); *B60R 22/00* (2013.01)

(58) Field of Classification Search
CPC ............ A44B 11/2569; A44B 11/2561; A44B 11/2534; B60R 22/00
See application file for complete search history.

(56) References Cited

U.S. PATENT DOCUMENTS

| | | | |
|---|---|---|---|
| 4,597,141 A * | 7/1986 | Wier | A44B 11/2523 24/633 |
| 6,233,794 B1 | 5/2001 | Kohlndorfer | |
| 6,389,661 B1 * | 5/2002 | Brown | B60R 22/48 24/633 |
| 8,621,729 B2 * | 1/2014 | Nimura | B60R 22/48 24/633 |
| 8,650,726 B2 * | 2/2014 | Nimura | A44B 11/2523 24/633 |

* cited by examiner

*Primary Examiner* — Robert Sandy
*Assistant Examiner* — Louis A Mercado
(74) *Attorney, Agent, or Firm* — Luedeka Neely Group, P.C.

(57) ABSTRACT

A buckle assembly includes a frame, a latch plate, and a tongue. The frame includes a latch opening and a slot for receiving the tongue. The latch plate is configured to be linearly displaced within the frame between a locked position and an unlocked position and includes a latch portion. The tongue includes a tongue opening having an angled leading end. When the tongue is inserted into the frame slot, the latch plate is biased to the locked position such that the latch portion of the latch plate traverses the angled leading end of the tongue opening until the angled leading end of the latch portion of the latch plate is secured in the latch opening in the locked position. In preferred embodiments, the buckle assembly includes a seat belt connected to the tongue for securing a user to a seat of a vehicle.

11 Claims, 2 Drawing Sheets

BUCKLE ASSEMBLY

FIELD

This disclosure relates to the field of buckle assemblies. More particularly, this disclosure relates to a seat belt buckle assembly for preventing false latching.

BACKGROUND

When buckling a seat belt, a user inserts a male tongue with an opening at its leading end into a female buckle assembly. The buckle assembly generally includes a latch opening, a spring-loaded latch plate, and a locking mechanism. When the user inserts the leading end of the male tongue into the buckle assembly, a portion of the latch plate is designed to pass through the tongue opening and into the latch opening, resulting in the male tongue being locked in place in the female buckle by the locking mechanism. The latch plate successfully inserted through the tongue opening and into the latch opening such that the locking mechanism is fully engaged in the properly latched, fully locked position is referred to herein as the "locked position." To unbuckle the seat belt, the user typically pushes on a release mechanism (e.g., button) on the buckle assembly to disengage the locking mechanism such that the tongue is able to be freely removed from the buckle assembly. The release mechanism being activated so that the locking mechanism is disengaged is referred to herein as the "unlocked position."

One example of this type of seat belt design is exemplified in U.S. Pat. No. 6,233,794, the disclosure of which is incorporated herein by reference. As shown and described in the '794 Patent, its buckle assembly generally includes a frame having lower and upper frame portions, a latch plate that is linearly translatable within the frame, and a tongue having a tongue opening. The lower frame portion includes a latch opening and two raised sides extending substantially perpendicular to opposing sides of the latch opening. The raised sides include slots disposed therein to allow for linear translation of the latch plate. The first frame portion and second frame portion are able to be assembled together to form a slot for receiving the tongue. In operation, the tongue is inserted into the slot of the assembled frame and the latch plate is biased towards the lower portion of the raised sides of the lower frame portion such that the middle latch portion of the latch plate traverses the tongue opening and is inserted into the latch opening.

"False latching" is a not uncommon seat belt malfunction which occurs when the seat belt tongue is believed by the user to be in the locked position when in fact the latch has not successfully been completely inserted through the tongue opening. As a result, the locking mechanism is not fully engaged and the seat belt buckle is not in a safe position. False latching occurs because the latch plate stays in the buckle and looks, feels, and/or sounds like it is secured in the locked position to the user by virtue of the fact that part of the latch plate has been inserted through the tongue opening and partially into the latch opening. However, because the locking mechanism is not fully engaged, the male tongue may be withdrawn from the buckle assembly as a result of an automobile crash, the loading of the seat belt by the occupant and/or contact directly with the seat belt buckle (hitting of the seat belt buckle). For purposes of the present disclosure, the latch plate being incompletely inserted through the tongue opening without the release mechanism being activated is referred to herein as the "false latched position" (also known as a "false locked position").

What is needed therefore is a seat belt buckle design that eliminates false latching and significantly reduces the chance of partial engagement of the latch plate with the latch opening.

SUMMARY

According to one embodiment of the disclosure, a buckle assembly includes a frame, a latch plate, and a tongue. The frame includes a latch opening and a slot for receiving the tongue. The latch plate is configured to be linearly displaced within the frame between a locked position and an unlocked position and includes a latch portion having an angled leading end. The tongue includes a tongue opening also having an angled leading end. When the tongue is inserted into the frame slot, the latch plate is biased to the locked position such that the angled leading end of the latch portion of the latch plate traverses the angled leading end of the tongue opening until the angled leading end of the latch portion of the latch plate is secured in the latch opening in the locked position. In preferred embodiments, the buckle assembly includes a seat belt connected to the tongue for securing a user to a seat of a vehicle.

According to certain embodiments, when the tongue is inserted into the frame slot but the latch portion of the latch plate is not in the locked position, the angled leading ends of the latch portion of the latch plate and the tongue opening results in an incomplete engagement, spitting out the tongue and preventing a false latched position.

In preferred embodiments, the angled leading end of the tongue opening is congruent to the angled leading end of the latch portion of the latch plate. In more preferred embodiments, the angled leading end of the tongue opening and angled leading end of the latch portion of the latch plate are congruent angles between about 30° and 60°. According to certain embodiments, the angled leading end of the tongue opening and angled leading end of the latch portion of the latch plate are both about 45°. According to other embodiments, the angled leading end of the tongue opening and angled leading end of the latch portion of the latch plate may be different but are both between about 30° and 60°.

According to another embodiment of the disclosure, a buckle assembly includes a frame, a latch plate, and a tongue. The frame includes a latch opening and a slot for receiving the tongue. The latch plate is configured to be linearly displaced within the frame between a locked position and an unlocked position and includes a latch portion. The tongue includes a tongue opening having an angled leading end. When the tongue is inserted into the frame slot, the latch plate is biased to the locked position such that the latch portion of the latch plate traverses the angled leading end of the tongue opening until the angled leading end of the latch portion of the latch plate is secured in the latch opening in the locked position. In preferred embodiments, the buckle assembly includes a seat belt connected to the tongue for securing a user to a seat of a vehicle.

According to certain embodiments, when the tongue is inserted into the frame slot but the latch portion of the latch plate is not in the locked position, the angled leading end the tongue opening prevents a false latched position by spitting out the tongue.

According to certain embodiments, the angled leading end of the tongue opening is about 45°. According to other embodiments, the angled leading end of the tongue opening is between about 30° and 60°.

According to yet another embodiment of the disclosure, a seat belt assembly includes a frame, a latch plate, and a tongue. The frame includes a latch opening and a slot for receiving the tongue. The latch plate is configured to be linearly displaced within the frame between a locked position and an unlocked position and includes a latch portion having an angled leading end. The tongue has a tongue opening including an angled leading end that is congruent to the angled leading end of the latch portion of the latch plate. When the tongue is inserted into the frame slot, the latch plate is biased to the locked position such that the angled leading end of the latch portion of the latch plate traverses the angled leading end of the tongue opening until the angled leading end of the latch portion of the latch plate is secured in the latch opening in the locked position. When the tongue is inserted into the frame slot but the latch portion of the latch plate is not in the locked position, the angled leading ends of the latch portion of the latch plate and the tongue opening prevents a false latched position by ejecting the tongue.

BRIEF DESCRIPTION OF THE DRAWINGS

Various advantages are apparent by reference to the detailed description in conjunction with the figures, wherein elements are not to scale so as to more clearly show the details, wherein like reference numbers indicate like elements throughout the several views, and wherein.

DETAILED DESCRIPTION

In the following detailed description of the preferred and other embodiments, reference is made to the accompanying drawings, which form a part hereof, and within which are shown by way of illustration the practice of specific embodiments of the disclosure. It is to be understood that other embodiments may be utilized, and that structural changes may be made and processes may vary in other embodiments.

Figure 1:
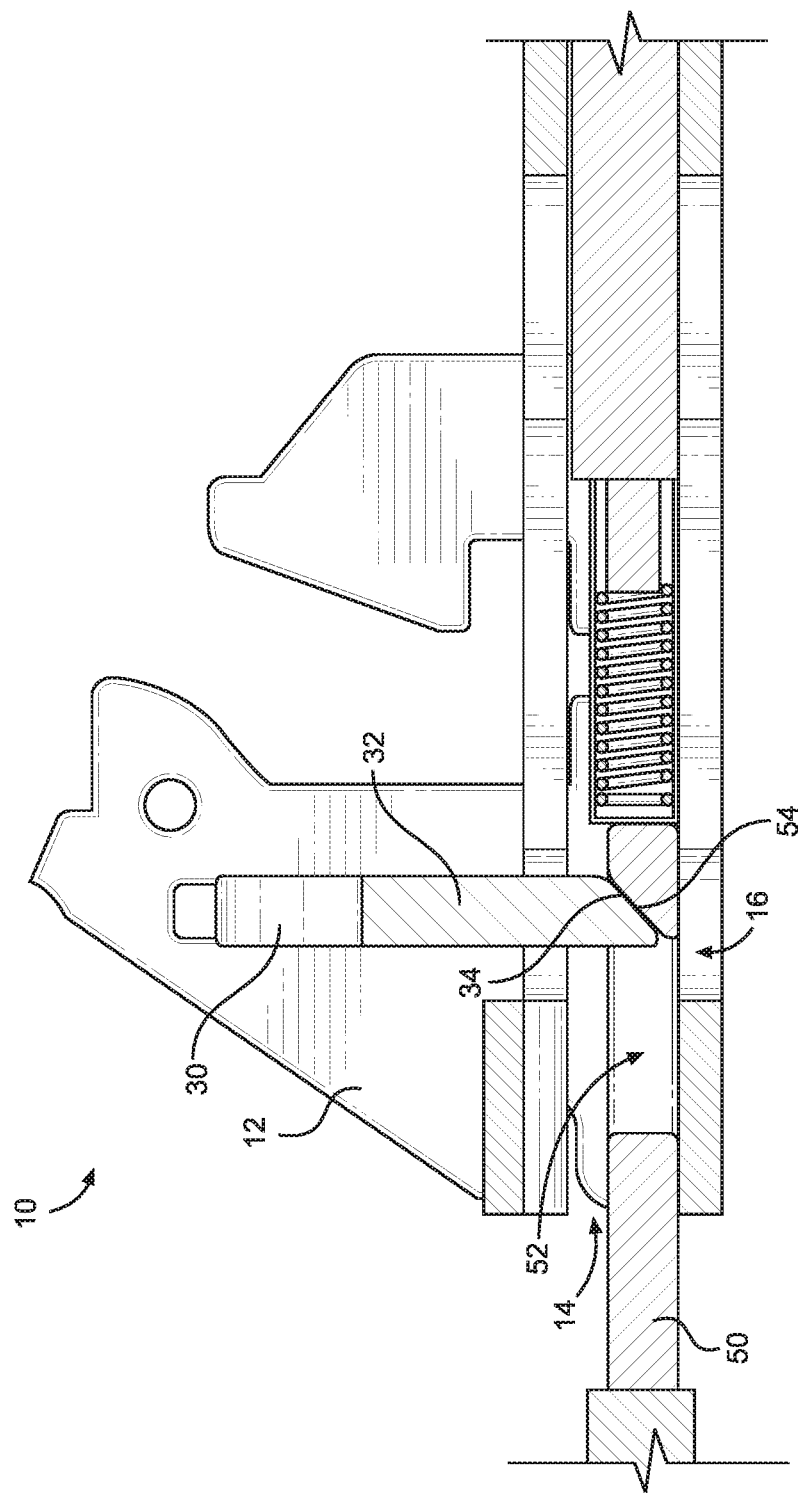
FIG. 1 depicts a cross-sectional view of a buckle assembly according to one embodiment of the disclosure.

Referring to FIG. 1, a buckle assembly 10 according to the present disclosure generally includes a frame 12, a latch plate 30 that is linearly translatable within the frame 12, and a tongue 50 having a tongue opening 52. The frame includes a slot 14 for receiving the tongue 50 and a latch opening 16. The latch plate 30 includes a middle latch portion 32. In operation, the tongue 50 is inserted into the slot 14 of the frame 12 and the latch plate 30 is biased towards the latch opening 16 such that the latch portion 32 is inserted through the tongue opening 52 and into the latch opening 16. A locking mechanism (not shown) is intended to secure the tongue 50 in the locked position until a release mechanism (also not shown) disengages the locking mechanism such that the tongue 50 is able to be freely removed from the buckle frame 12.

Figure 2:
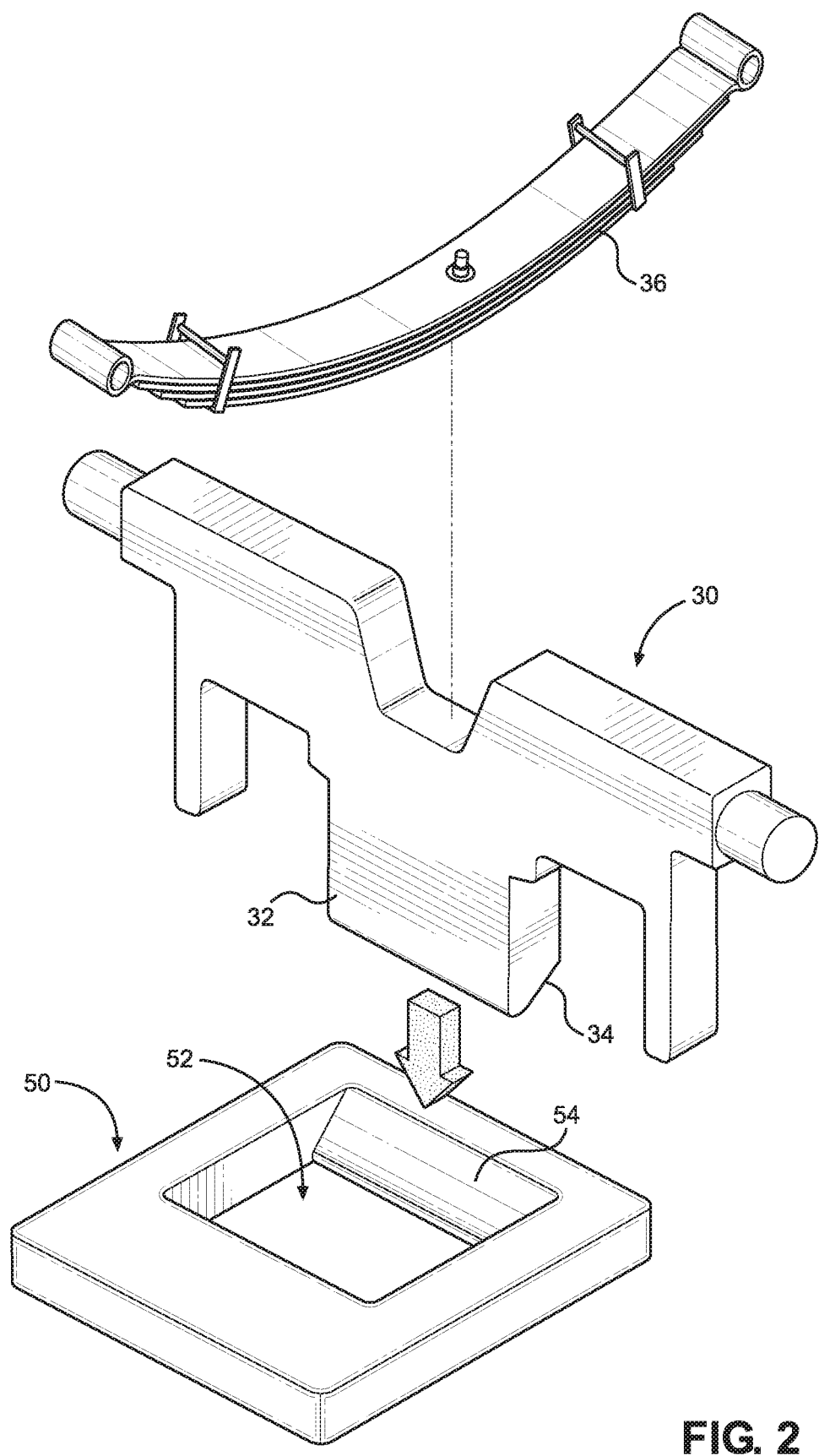
FIG. 2 depicts an exploded view of the leading ends of the latch portion of and tongue opening according to one embodiment of the disclosure.

As shown best in the exploded view of FIG. 2, the tongue opening 52 of tongue 50 includes a leading end 54. To prevent the "false latched position" described above, the leading end 54 of tongue opening 52 includes an angled surface (referred to herein as an angled leading end 54) that slopes towards the latch opening 16 when the tongue 50 is inserted into frame slot 14. Accordingly, the angled leading end 54 of the tongue opening 52 acts as a ramp to facilitate the latch portion 32 towards the latch opening 16, where the latch portion 32 is secured in the locked position.

As also shown best in the exploded view of FIG. 2, the latch portion 32 of latch plate 30 preferably includes an angled leading end 34 that corresponds to the angled leading end 54 of the tongue opening 52. For purposes of the present disclosure, angled leading end 34 of latch portion 32 and angled leading end 54 of the tongue opening are referred to as "corresponding" (or one end that "corresponds" with another end when appropriate) because the surfaces slope in generally the same direction and at a similar angle. As a result of the angled leading end 34 of latch portion 32 being biased towards the latch opening 16 (such as with a leaf spring 36 as shown in FIG. 2 or other type of biasing member as known in the art that would be operatively connected to the frame 12 of FIG. 1), the corresponding angles of the leading ends 34 and 54 mate together and further facilitate the latch portion 32 towards the latch opening 16. Further, the corresponding angled leading ends 34 and 54 are preferable dimensioned and configured such that the latch portion 32 is secured in the locked position once the angled leading end 34 of latch portion 32 completely traverses the angled leading end 54 of the tongue opening 52. In other words, the leading ends 34 and 54 are preferably dimensioned and configured such that the locking mechanism of the buckle assembly is able to fully engage the latch portion 32 of latch plate 30 in the locked position as soon as the angled leading end 34 of latch portion 32 traverses the angled leading end 54 of tongue opening 52.

On the other hand, if the angle leading end 34 of latch portion 32 does not fully traverse the angled leading end 54 of tongue opening 52, the corresponding angled leading ends 34 and 54 prevent a false latched position as a result of the angled leading end 54 of tongue opening 52 providing an opposite force on the angled leading end 34 of latch portion 32 when a user stops pushing the tongue 50 further into the frame slot 14. In other words, when tongue 50 is inserted into the frame slot 14 but the latch portion 32 of latch plate 30 is not in the locked position, the angled leading ends 34, 54 of the latch plate 30 and tongue opening 52 operate to "spit out" the tongue 50 from the latch plate 30. As a result of the "spitting out" of the tongue 50, the user is notified that the buckle assembly 10 is not serving its intended purpose (i.e., the latch portion 32 of latch plate 30 is not in the fully locked position) and the tongue 50 should be reinserted.

According to preferred embodiments, the angled leading end 54 of the tongue opening 52 is congruent (i.e., same angle degree) to the angled leading end 34 of the latch portion 32 of the latch plate 30. In preferred embodiments, the angled leading end 54 of the tongue opening 52 and angled leading end 34 of the latch portion 32 of the latch plate 30 are both between about 30° and 60°. In most preferred embodiments, the corresponding angled leading ends 34 and 54 are both about 45°.

For purposes of the present disclosure, it should be understood that the particular configuration of frame 12, latch plate 30, locking mechanism, release mechanism, etc. are not critical so long as the assembly includes a linearly displaceable latch plate 30 having a latch portion 32 that is intended to be inserted through a tongue opening 52 and into a latch opening 16 for locking the tongue 50 to the frame 12. As noted above, one example of this type of buckle design is disclosed in U.S. Pat. No. 6,233,794.

Also, while it should be understood that the buckle assembly of the present disclosure may be used in a wide variety of applications, the buckle assembly is preferably used in a seat belt system for automobiles and other vehicles.

The foregoing descriptions of embodiments have been presented for purposes of illustration and exposition. They are not intended to be exhaustive or to limit the embodiments to the precise forms disclosed. Obvious modifications or variations are possible in light of the above teachings. The embodiments are chosen and described in an effort to provide the best illustrations of principles and practical applications, and to thereby enable one of ordinary skill in the art to utilize the various embodiments as described and with various modifications as are suited to the particular use contemplated. All such modifications and variations are within the scope of the appended claims when interpreted in accordance with the breadth to which they are fairly, legally, and equitably entitled.

What is claimed is:

1. A buckle assembly comprising:
   a frame having a latch opening and a slot for receiving a tongue;
   a latch plate configured to be linearly displaced along a first axis within the frame between a locked position and an unlocked position, the latch plate including a latch portion having an angled leading end sloped at an angle between about 30° and 60° to the first axis; and
   a tongue configured to be linearly displaced along a second axis within the frame wherein the second axis is substantially perpendicular to the first axis, the tongue having a tongue opening, the tongue opening including a front end and a rear end, the front end having an upper surface and a lower surface, the lower surface extending substantially parallel to the second axis from a proximal end to a distal end, and the upper surface including an angled leading end that is sloped at an angle between about 30° and 60° with respect to the second axis from a proximal end of the angled leading end of the upper surface to the distal end of the lower surface,
   wherein, when the tongue is inserted into the slot of the frame, the latch plate is biased to the locked position such that the angled leading end of the latch portion of the latch plate traverses the angled leading end of the tongue opening until the angled leading end of the latch portion of the latch plate is secured in the latch opening in the locked position.

2. The buckle assembly of claim 1 wherein, when the tongue is inserted into the slot of the frame but the latch portion of the latch plate is not in the locked position, the angled leading ends of the latch portion of the latch plate and the tongue opening prevents a false latched position by spitting out the tongue from the latch plate.

3. The buckle assembly of claim 1 wherein the angled leading end of the tongue opening is congruent to the angled leading end of the latch portion of the latch plate.

4. The buckle assembly of claim 3 wherein the angled leading end of the tongue opening and the angled leading end of the latch portion of the latch plate are both about 45°.

5. The buckle assembly of claim 1 wherein the buckle assembly is a seat belt buckle.

6. A buckle assembly comprising:
   a frame having a latch opening and a slot for receiving a tongue;
   a latch plate configured to be linearly displaced within the frame along a first axis between a locked position and an unlocked position, the latch plate including a latch portion having an angled leading end; and
   a tongue configured to be linearly displaced along a second axis within the frame wherein the second axis is substantially perpendicular to the first axis, the tongue having a tongue opening, the tongue opening including a front end and a rear end, the front end having an upper surface and a lower surface, the lower surface extending substantially parallel to the second axis from a proximal end to a distal end, and the upper surface including an angled leading end that is sloped at an angle between about 30° and 60° with respect to the second axis from a proximal end of the angled leading end of the upper surface to the distal end of the lower surface,
   wherein, when the tongue is inserted into the slot of the frame, the latch plate is biased to the locked position such that the latch portion of the latch plate traverses the angled leading end of the tongue opening until the latch portion of the latch plate is secured in the latch opening in the locked position.

7. The buckle assembly of claim 6 wherein, when the tongue is inserted into the slot of the frame but the latch portion of the latch plate is not in the locked position, the angled leading end of the tongue opening prevents a false latched position by spitting out the tongue from the latch plate.

8. The buckle assembly of claim 6 wherein the angled leading end of the tongue opening is about 45°.

9. The buckle assembly of claim 6 wherein the buckle assembly is a seat belt buckle.

10. A seat belt assembly comprising:
    a frame having a latch opening and a slot for receiving a tongue;
    a latch plate configured to be linearly displaced along a first axis within the frame between a locked position and an unlocked position, the latch plate including a latch portion having an angled leading end sloped at an angle between about 30° and 60° to the first axis; and
    a tongue configured to be linearly displaced along a second axis within the frame wherein the second axis is substantially perpendicular to the first axis, the tongue having a tongue opening, the tongue opening including a front end and a rear end, the front end having an upper surface and a lower surface, the lower surface extending substantially parallel to the second axis, and the upper surface including an angled leading end extending from a proximal end to a distal end of the lower surface with the angled leading end being congruent to the angled leading end of the latch portion of the latch plate,
    wherein, when the tongue inserted into the slot of the frame, the latch plate is biased to the locked position such that the angled leading end of the latch portion of the latch plate traverses the angled leading end of the tongue opening until the angled leading end of the latch portion of the latch plate is secured in the latch opening in the locked position, and
    wherein, when the tongue is inserted into the slot of the frame but the latch portion of the latch plate is not in the locked position, the angled leading ends of the latch portion of the latch plate and the tongue opening prevents a false latched position.

11. The seat belt assembly of claim 10 wherein the angled leading end of the tongue opening and the angled leading end of the latch portion of the latch plate are both about 45°.

* * * * *